United States Patent [19]

Zimmermann et al.

[11] 3,939,136

[45] Feb. 17, 1976

[54] POLYMERISATION OF CYCLOOCTENE

[75] Inventors: Manfred Zimmermann, Cologne;
Guenther Lehnert, Leverkusen;
Dieter Maertens, Leverkusen;
Gottfried Pampus, Leverkusen, all of Germany

[73] Assignee: Bayer Aktiengesellschaft, Germany

[22] Filed: July 2, 1974

[21] Appl. No.: 485,294

[30] Foreign Application Priority Data
July 7, 1973 Germany............................ 2334604

[52] U.S. Cl.... 260/93.1; 260/33.6 UA; 260/88.2 B; 260/88.2 D; 260/88.2 E; 260/88.2 F; 252/429 B
[51] Int. Cl.$^2$............................................ C08F 4/14
[58] Field of Search......... 260/93.1, 88.2 D, 88.2 E, 260/88.2 F; 450/661.5

[56] References Cited
UNITED STATES PATENTS
3,449,310  6/1969  Dall'Asta et al................... 260/93.1
3,790,543  2/1974  Lehnedt et al..................... 260/93.1

*Primary Examiner*—Stanford M. Levin
*Attorney, Agent, or Firm*—Connolly and Hutz

[57] ABSTRACT

Polyoctenamers, in which more than 80% of the C=C-double bonds are in the cis-configuration, with a second order transition temperature of approximately −90°C, a crystallisation temperature of from −30° to +10°C and a melting point of +10 to +40°C and a process for its production, wherein cyclooctene and, optionally, up to 20% by weight, based on the monomer total, of another cyclic olefin are polymerised in an inert organic solvent at temperatures of from −50° to +10°C in the presence of a catalyst of
A. a tungsten halide or oxyhalide,
B. an alcohol or a halogen substituted alcohol,
C. an organometallic compound of aluminium, and
D. boron trifluoride or boron trifluoride etherate.

6 Claims, No Drawings

POLYMERISATION OF CYCLOOCTENE

It is known to polymerise cyclooctene via ring cleavage in the presence both of compounds of tungsten and of organo-metallic compounds of metals of group 1a to 3a of the Periodic System[1] to form linear unsaturated polyoctenamers. The C=C-double bonds of the resulting polyoctenamers are predominantly in the trans-configuration.

Reference is made in German Offenlegungsschrift No. 2,051,798 to the possibility of obtaining polyoctenamers having from 70 to 80% of the C=C-double bonds in the cis-configuration, at a low polymerisation temperature. Unfortunately, the conversions obtained in this process are poor.

The present invention relates to polyoctenamers having more than 80%, preferably 85 to 90%, of the C=C-double bonds in the cis-configuration, and to a process for their production. Polyoctenamers of this kind are referred to hereinafter as cis-polyoctenamers. In the context of the invention, cis-polyoctenamers also include copolymers of cyclooctene with up to 20% by weight, based on the monomer total, of another cyclo-olefin, for example cyclopentene, cyclooctadiene, cyclodecene, cyclododecene or cyclododecatriene.

The cis-polyoctenamers according to the invention are rubber-like substances with a second order transition temperature of about −90°C. They crystallise at temperatures in the range of from −30° to +10°C, and melt at temperatures in the range of from +10° to +40°C. The cis-content was determined by IR-spectroscopy.

The invention also relates to a process for the production of cis-polyoctenamers, wherein cyclooctene and, optionally, up to 20% by weight, based on the monomer mixture, of another cyclic olefin are polymerised in an inert organic solvent at a temperature in the range of from −50° to +10°C in the presence of a catalyst comprising:

A. a tungsten halide or oxyhalide;
B. an alcohol or a halogen substituted alcohol,
C. an organometallic compound of aluminium; and
D. boron trifluoride or boron trifluoride etherate.

The catalyst contains preferably

A. as tungsten halide or oxyhalide $WCl_6$, $WBr_6$, $WF_6$, $WCl_5$ or $WoCl_4$; $WCl_6$ being most preferred;
B. as alcohol a monohydric aliphatic alcohol with 1 to 6 carbon atoms, for example ethanol or propanol; as halogen substituted alcohol an aliphatic monohydric alcohol having 2 to 6 carbon atoms, for example 2-chloro-ethanol, 2-chloro-propanol and 2-bromo-ethanol;
C. as organometallic compound of aluminium a compound corresponding to the general formula
$AlR_nX_{3-n}$
in which R is an alkyl radical, preferably having 1 to 6 carbon atoms, X is chlorine or bromine and $n$ is 1, 1.5, 2 or 3, for example trimethylaluminium, triethylaluminium, aluminiumdiethylchloride, aluminium ethyldichloride and ethylaluminium sesquichloride (ethylaluminium dichloride being particularly preferred); and
D. boron trifluoride or a boron trifluoride etherate, preferably $BF_3.O(C_2H_5)_2$.

Components A and B can be used in a molar ratio of 1 : 1 to 1 : 5, preferably in a molar ratio of about 1 : 2. The organoaluminium compound C is preferably used in a molar ratio of 1 : 1 to 1 : 6, to the tungsten halide A.

The molar ratio of the boron trifluoride or its etherate D to the tungsten halide A can vary from 0.1 : 1 to 10 : 1. The two components are preferably used in equimolecular proportions.

The polymerisation reaction can be carried out at a temperature of from −50° to +10°C, preferably at a temperature of from −40° to −20°C.

The process according to the invention is generally carried out in an inert solvent, such as toluene, cyclohexane, hexane or methylene chloride, with a cyclooctene concentration of 1 to 50% by weight, preferably 10 to 25% by weight. In general, the catalyst components are successively added to a solution of the cyclooctene. The order A/B/D/C is preferred. It is possible with advantage initially to react the tungsten halide in part of the solvent used with the alcohol or halogen substituted alcohol subsequently ot add this solution to the monomer solution in the required quantity and then to add the other components $BF_3.Et_2O$ and $AlR_nX_{3-n}$. The catalyst is generally used in a quantity corresponding to 0.01 to 10m Mol, preferably in a quantity of from 0.05 to 1 m Mol of tungsten/100 g of cyclooctene. The polymerisation reaction is carried out in the absence of water and air in an inert-gas atmosphere, for example argon or nitrogen.

It is readily possible by virtue of the process according to the invention to obtain polyoctenamers with a cis-double bond content of more than 80% without any reduction in yield, even despite the low temperatures required for obtaining a high cis-double bond content. Yields of more than 80% are obtained.

On completion of polymerisation, the polyoctenamers can be isolated and purified in conventional manner. After the polymerisation reaction has been stopped by addition of an alcohol, carboxylic acid or amine, the catalyst residues can be removed by precipitating the polymers in a precipitant, such as acetone or methanol. Stabilisers normally used for rubber, such as phenyl-β-naphthylamine or 2,2'-dihydroxy-3,3'-di-tert.-butyl-5,5'-dimethyldiphenyl-methane, can be added in quantities of from 0.2 to 3%.

The polymers obtained in accordance with the invention are rubber-like substances which can be cross-linked with usual vulcanisation systems.

EXAMPLES

Production of $WCl_4(OC_2H_4Cl)_2$ 2.01 g of 2-chloroethanol in 50 ml of toluene were added dropwise to a suspension of 4.95 g of $WCl_6$ in 200 ml of toluene in a stirrer-equipped flask. The solution was 0.05 molar, based on tungsten.

EXAMPLE 1

700 ml of toluene and 100 g of cyclooctene (COE) were introduced into a 2 liter vessel equipped with a stirrer and thermometer. The mixture was cooled to −30°C, followed by addition of the catalyst components: 0.5 mMol of $WCl_4$ $(OC_2H_4Cl)_2$, 0.5 mMol of $BF_3.Et_2O$ and 1.5 mMol of $EtAlCl_2$ in the form of an 1 molar solution in hexane.

Polymerisation began immediately. The temperature was kept at −30°C by cooling. After 2 hours, the conversion reached 82%. Polymerisation was then stopped by the addition of 10 ml of a 10% $(n-Bu)_3$ N-solution in toluene and 0.5 g of 2,2'-dihydroxy-3,3'-di-tert.-butyl- 5,5'-dimethyldiphenyl-methane. The polymer solution was precipitated in 3 liters of ethanol. The polymer was dried in vacuo at 40°C.
Cis-double bond content: 92.1%
Inherent viscosity in toluene at 25°C: 4.08 [dl/g].

The ratio of cis- to trans-double bonds was determined by IR-spectroscopy by measuring the bands at 3002 cm$^{-1}$ for the cis-double bonds and 965 cm$^{-1}$ for the trans-double bonds.

$$\text{Calculation \% cis} = \frac{1/648\ E_{3002}}{1/648\ E_{3002} + 1/978\ E_{965}} \cdot 100$$

EXAMPLE 2

The procedure was as in Example 1, except that 200 ppm of butene butene-1 (based on cyclooctene) were added. A polymer with an inherent viscosity of 1.82 [dl/g] was obtained in a yield of 75%.
Cis-double bond content: 89.4%.

EXAMPLE 3 (Comparison Example)

The procedure was as in Example 1, except that no $BF_3.Et_2O$ was added. The yield amounted to 52%.
Inherent viscosity: 1.13 [dl/g].
The cis-double bond content only amounted to 63.9%.

EXAMPLE 4 (Comparison Example)

100 g of COE was dissolved in 700 ml of hexane. 0.5 mMol of $WCl_6$, 1.5 mMol of acetic acid and 2.0 mMol of $EtAlCl_2$ were used as catalyst. Polymerisation was carried out over a period of 2 hours at −40°C. The yield amounted to 10%, and the cis-double bond content to 75%.

EXAMPLE 5 (Comparison Example)

In Example 5, toluene instead of hexane was used as the solvent. The further procedure was as in Example 4. A cross-linked polymer, 90% the double bonds of which were in the trans-configuration was obtained in a yield of 90%.

EXAMPLE 6

100 g of COE were dissolved in 700 ml of toluene, followed by the addition of 1.0 mMol of $WCl_4(OC_2H_4Cl)_2$, 0.5 mMol of $BF_3.Et_2O$ and 3 mMol of $Et_2AlCl$. Polymerisation was carried out over a period of 2 hours at −20°C. The yield amounted to 76%.
Inherent viscosity: 1.08 dl/g.

We claim:
1. A process for the production of a polyoctenamer in which at least 80% of the C=C -double bonds are in the cis-configuration, wherein cyclooctene is polymerised in an inert organic solvent at a temperature of from −50° to +10°C. in the presence of a catalyst comprising:
A. a tungsten halide or oxyhalide;
B. an alcohol or a halogen substituted alcohol;
C. an organometallic compound of aluminum and
D. boron trifluoride or boron trifluoride therate,
components A and B being in a molar ratio of from 1:1 to 1:5, components C and A being in a molar ratio of from 1:1 to 1:6 and components D and A being in a molar ratio of from 0.1:1 to 10:1.

2. A process as claimed in claim 1, wherein component A is $WCl_6$, $WBr_6$, $WF_6$, $Wcl_5$ or $WOCl_4$.

3. A process as claimed in claim 1, wherein component B is a monohydric aliphatic alcohol having 1 to 6 carbon atoms or an aliphatic monohydric alcohol having 2 to 6 carbon atoms substituted by chlorine.

4. A process as claimed in claim 1, wherein component C is a compound corresponding to the formula
$$AlR_nX_{3-n}$$
in which R is an alkyl radical, X is Cl or Br and n is 1, 1.5, 2 or 3.

5. A process as claimed in claim 1 wherein the reaction is carried out at a temperature in the range of from −40° to −20°C.

6. A process as claimed in claim 1 wherein the reaction is carried out in an inert solvent.

* * * * *